United States Patent [19]
Leugs et al.

[11] Patent Number: 6,160,037
[45] Date of Patent: Dec. 12, 2000

[54] REACTIVE EXTRUSION OF LATENT PIGMENTS

[75] Inventors: Johannes Leugs, Geleen, Netherlands; Zhimin Hao, Marly; Abul Iqbal, Arconciel, both of Switzerland

[73] Assignee: Ciba Specialty Chemicals Corporation, Tarrytown, N.Y.

[21] Appl. No.: 09/111,580

[22] Filed: Jul. 8, 1998

[30] Foreign Application Priority Data

Jul. 10, 1997 [EP] European Pat. Off. ............. 97810458
Dec. 16, 1997 [EP] European Pat. Off. ............. 97810987

[51] Int. Cl.$^7$ ................ C08J 3/00; C08K 9/00; C08L 33/08; C03C 17/00; C09D 11/12

[52] U.S. Cl. ............ 523/205; 106/31.13; 106/31.16; 430/56; 430/517; 430/541; 523/105; 523/160; 523/161; 524/401; 524/700; 524/849; 524/853

[58] Field of Search ............................ 523/205, 160, 523/161, 105; 524/401, 700, 849, 853; 106/31.13, 31.16; 430/517, 541, 56

[56] References Cited

U.S. PATENT DOCUMENTS

| | | | |
|---|---|---|---|
| 3,734,872 | 5/1973 | Wakimoto et al. | 260/22 |
| 5,470,502 | 11/1995 | Hahn et al. | 252/301.35 |
| 5,484,943 | 1/1996 | Zambounis et al. | 548/453 |
| 5,561,232 | 10/1996 | Hao et al. | 546/14 |
| 5,578,407 | 11/1996 | Kasuya et al. | 430/106 |

FOREIGN PATENT DOCUMENTS

| | | |
|---|---|---|
| 782640 | 4/1972 | Belgium . |
| 0456610 | 11/1991 | European Pat. Off. . |
| 0542669 | 5/1993 | European Pat. Off. . |
| 0590935 | 4/1994 | European Pat. Off. . |
| 0654711 | 5/1995 | European Pat. Off. . |
| 0742255 | 11/1996 | European Pat. Off. . |
| 96/31565 | 10/1996 | WIPO . |

OTHER PUBLICATIONS

Derwent Abstract 73–00921U for BE 782640.

*Primary Examiner*—Patrick D. Niland
*Attorney, Agent, or Firm*—David R. Crichton; Kevin T. Mansfield

[57] ABSTRACT

Pigment composition obtainable by (a) mixing a latent pigment with a polymerizable substance, and (b) treating the mixture of step (a) with heat while mixing the reaction mixture, and (c) cooling the treated reaction mixture to room temperature, and, if desired, working up the obtained pigment composition, a process for its preparations, its use and compositions comprising it.

16 Claims, No Drawings

REACTIVE EXTRUSION OF LATENT PIGMENTS

The present invention relates to a pigment composition obtainable by
(a) mixing a latent pigment with a polymerizable substance,
(b) treating the mixture of step (a) with heat while mixing the reaction mixture, and
(c) cooling the treated reaction mixture to room temperature, and, if desired working up the obtained pigment composition.

In view of the strong tendency towards improved industrial hygiene, customers are more and more switching from powder pigments to the use of pigment preparations. An optimum dispersion of the pigment preparation is a requirement of a good pigment preparation. Especially transparent pigments (pigments which color a transparent application) are extremely difficult to disperse.

Transparent applications can easily be obtained using (soluble) dyes, but dyes do not have the good fastness as most pigments do.

EP-A 654 711 describes compositions comprising a soluble latent pigment which can be transformed to an insoluble pigment and a polymer or prepolymer which can be structured by crosslinking, polymerization or depolymerization. For example reactive binders can be used, i.e. unsaturated polymers obtained by condensation of maleic and fumaric acid with glycols, polyfunctional acrylates based on bisphenol A and other polyfunctional prepolymers. However, the use of simple monomer units like acrylates, methacrylates etc. to prepare polymers in the presence of latent pigments is neither taught nor made obvious, because the object of EP-A 654 711 was to provide thin films for making structured color images.

EP-A 542 669 describes a process for the manufacture of pigments, especially fluorescent pigments, wherein the reactants for the formation of a polycondensation resin and a colored composition are introduced continuously into a reactor, where the components are mixed and the polycondensation resin is built.

A similar reaction is described in EP-A 456 610 where fluorescent pigments comprising a colored composition in a thermoset crosslinked resin are obtained by continuous bulk polycondensation of a sulfonamide with an aldehyde and a substance containing at least two amino groups.

Known mixtures of pigments and polymers, prepared by known methods of mixing pigments and polymers, do have the drawbacks that their dispersibility, transparency and color strength are not satisfactory for certain applications, e.g. for its use as automotive lacquers.

Hence, an object of the present invention was to provide a pigment composition which does not exhibit the above mentioned drawbacks. Particularly, the dispersibility, the transparency and the color strength should be improved compared to corresponding known compositions. Another object of the invention on hand was to provide an easy, industrial applicable method for the preparation of such pigment compositions. Particularly preferred, a pigment composition which is not a thin film should be provided having pigment particles with a nano-sized structure.

In addition, the pigment compositions should be applicable for the preparation of coloring high molecular weight organic materials, preferably biopolymers, and plastic materials, glasses, ceramic products, for formulations in decorative cosmetics, for the preparation of inks, preferably printing inks, gravure inks, offset inks, screen printing inks, security inks, stationary inks, coating inks, jet-inks, inks for stamp pads, inks for impact printing ribbons, inks for packaging printing; paint systems, in particular automotive lacquers, preferably on the base of high solid, waterborne, metallic paints, industrial paints, trade sales paints, coil coating and powder coating; non-impact printing material preferably for thermal wax transfer, ink-jet printing, thermal dye diffusion transfer; colored polymer particles preferably for color toners, particularly preferred for dry copy toners, liquid copy toners, electrographic toners; color filters, preferably for the preparation of liquid crystal displays and charge combined devices; colored photoresists, photo- and electroconductive polymers, photocell aggregates, dispersion colors, in the biomedical field of application, for solar energy and collecting systems, for coloring porous substrates and photo/repro in general.

Accordingly, a pigment composition, preferably comprising nano-sized pigment particles, was found which is obtainable by
(a) mixing a latent pigment with a polymerizable substance, and
(b) treating the mixture of step (a) with heat while mixing the reaction mixture, and
(c) cooling the treated reaction mixture to room temperature, and, if desired working up the obtained pigment composition.

Further, a process for its preparation, its use and compositions comprising the inventive pigment compositions were found, too.

Suitable latent pigments are described in detail e.g. in EP-A 654 711. Preferred latent pigments are compounds of the formula I

where x is an integer from 1 to 8,
A is a residue of a colorant of the quinacridone-, anthraquinone-, perylene-, indigo-, quino-phthalone-, indanthrone-, isoindolinone-, isoindoline-, dioxazine-, phthalocyanine- or diketopyrrolopyrrole- or azo series, which is linked to x groups B via one or more hetero atoms, wherein such hetero atoms are selected from the group consisting of N, O or S, and which are part of A,
B is a group represented by formulae

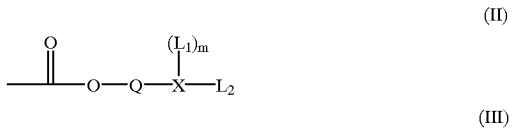

where, if x is an integer from 2 to 8, the groups B are the same or different, or 1 to 7 of the groups B are hydrogen, and wherein in formula II Q is p,q-$C_2$–$C_{12}$alkylene which can be unsubstituted or substituted by $C_1$–$C_{12}$alkoxy, $C_1$–$C_{12}$alkylmercapto, or $C_2$–$C_{24}$dialkylamino, wherein p and q are different numbers which characterize the positions of the bonds to O and X within the alkylene group, X is selected from the group consisting of N, O or S, wherein m is zero, if X is O or S, and m is 1, if X is N, and $L_1$ and $L_2$ are each independently $C_1$–$C_{12}$alkyl which can be unsubstituted or substituted by $C_1$–$C_{12}$alkoxy, $C_1$–$C_{12}$alkymercapto, $C_2$–$C_{24}$dialkylamino, $C_6$–$C_{12}$aryloxy, $C_6$–$C_{12}$arylmercapto, $C_7$–$C_{24}$arylalkylamino or $C_{12}$–$C_{24}$diarylamino or [—(p',q'—$C_2$–$C_{12}$alkylene)—Z—]$_n$—$C_1$–$C_{12}$alky wherein n is a number from 1 to 1000, p' and q' are different numbers characterizing the positions of the bonds to Z and X within the alkylene group, each Z independently from the others can be O, S or N, the latter can be substituted by $C_1$–$C_{12}$alkyl, and $C_2$–$C_{12}$alkylene can be the same or different with regard to the repeating units [—$C_2$–$C_{12}$Alkylen—Z—], and $L_1$ and $L_2$ can be saturated or unsaturated once or up to ten times, uninterrupted or interrupted at optional positions by one to ten groups selected from the group consisting of —(C=O)— and —$C_6H_4$—, and can bear zero or one to ten substituents selected from the group consisting of halogen, cyano or nitro, with the proviso, that if —Q— is —($CH_2$)$_r$—,—, wherein r is an integer from 2 to 12, and X is S, $L_2$ is not $C_1$–$C_4$alkyl which is unsubstituted, saturated and uninterrupted, and wherein in formulae III to V s, t and u are each independently of the other 0 or 1, $L_3$ is $C_1$–$C_{14}$-alkylene or $C_2$–$C_8$-alkenylene, M is a group —V—($CH_2$)qq—, T is a group —V—($CH_2$)$_{rr}$—, V is $C_3$–$C_6$-cycloalkylen, qq is a number between 1 and 6, rr is a number between 0 and 6, $R_a$ and $R_b$ are each independently of the other hydrogen, $C_1$–$C_6$-alkyl, $C_1$–$C_4$-alkoxy, halogen, CN, $NO_2$, phenyl or phenoxy which are unsubstituted or substituted by $C_1$–$C_4$-alkyl, $C_1$–$C_4$-alkoxy or halogen, W is hydrogen, CN, Si($R_a$)$_3$, a group C($R_e$)($R_f$)($R_g$), wherein $R_e$, $R_f$ and $R_g$ are each independently of the other hydrogen or halogen and at least one of the residues $R_e$, $R_f$ and $R_g$ is halogen, a group

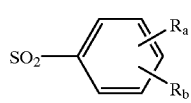

wherein $R_a$ and $R_b$ have the same meaning as given above, a group $SO_2R_h$ or $SR_h$, wherein $R_h$ is $C_1$–$C_4$-alkyl, a group CH($R_i$)$_2$, wherein $R_i$ is phenyl which is unsubstituted or substituted by $C_1$–$C_4$-alkyl, $C_1$4 $C_4$-alkoxy or halogen, or a group of formula

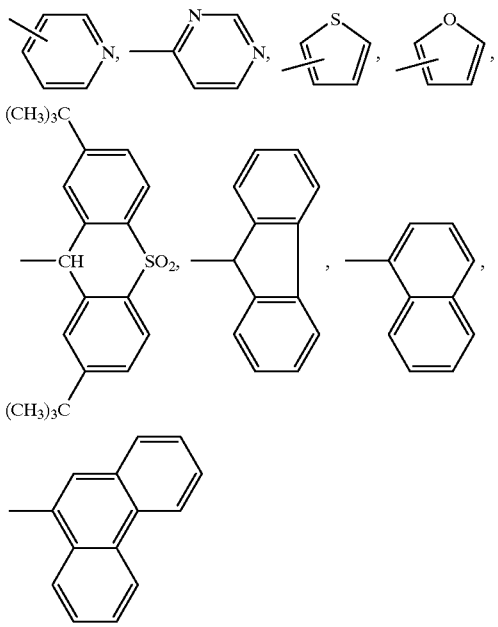

and $R_c$ and $R_d$ are each independently of the other hydrogen, $C_1$–$C_{18}$-alkyl or a group

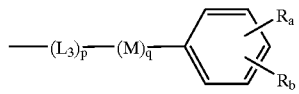

wherein $L_3$, M, $R_a$, $R_b$, s and t have the above given meaning, or $R_c$ and $R_d$ together with the nitrogen, on which they are bound, form a pyrrolidinyl-, piperidinyl- or morpholinyl residue, and wherein A(B)$_x$ may contain additional

=N—, —NH— or —$NH_2$ groups.

It is not necessary, and in many cases not indicated, that all the N atoms are linked to groups B; on the other hand, more than one group B may be linked to a single N atom.

Preferably, with the exception of phthalocyanines, A contains at least one carbonyl group either directly bonded or in conjugation with each of the heteroatoms bonded to the x groups B.

Alkyl or alkylene can be straight-chain, branched, mono- or polycyclic. $C_1$–$C_{24}$alkyl means e.g. $C_1$–$C_{12}$alkyl, tetradecyl, hexadecyl, octadecyl, eicosyl, dieicosyl and tetraeicosyl. $C_1$–$C_{12}$alkyl e.g. can be methyl, ethyl, n-propyl, isopropyl, n-butyl, sec.-butyl, isobutyl, tert.-butyl, cyclobutyl, n-pentyl, 2-pentyl, 3-pentyl, 2,2-dimethylpropyl, cyclopentyl, cyclohexyl, n-hexyl, n-octyl, 1,1,3,3-tetramethylbutyl, 2-ethylhexyl, nonyl, trimethylcyclohexyl, decyl, menthyl, thujyl, born0yl, 1-adamantyl, 2-adamantyl or dodecyl, preferably $C_1$–$C_6$alkyl such as methyl, ethyl, n-propyl, isopropyl, n-butyl, sec.-butyl, isobutyl, tert.-butyl, n-pentyl, 2-pentyl, 3-pentyl, 2,2-dimethylpropyl, n-hexyl.

$C_1$–$C_6$alkyl can be methyl, ethyl, n-propyl, isopropyl, n-butyl, sec.-butyl, isobutyl, tert.-butyl, n-pentyl, 2-pentyl, 3-pentyl, 2,2-dimethylpropyl (tert.amyl), n-hexyl, preferably $C_1$–$C_4$alkyl such as methyl, ethyl, n-propyl, isopropyl, n-butyl, sec.-butyl, isobutyl, tert.-butyl, and tert.-amyl.

$C_1$–$C_4$alkyl can be methyl, ethyl, n-propyl, isopropyl, n-butyl, sec.-butyl, isobutyl, tert.-butyl, preferably methyl and tert.-butyl.

$C_2$–$C_{12}$alkenyl can be vinyl, allyl, 2-propen-2-yl, 2-buten-1-yl, 3-buten-1-yl, 1,3-butadien-2-yl, 2-cyclobuten-1-yl, 2-penten-1-yl, 3-penten-2-yl, 2-methyl-1-buten-3-yl, 2-methyl-3-buten-2-yl, 3-methyl-2-buten-1-yl, 1,4-pentadien-3-yl, 2-cyclopenten-1-yl, 2-cyclohexen-1-yl, 3-cyclohexen-1-yl, 2,4-cyclohexadien-1-yl, 1-p-menthen-8-yl, 4(10)-thujen-10-yl, 2-norbornen-1-yl, 2,5-norbornadien-1-yl, 7,7-dimethyl-2,4-norcaradien-3-yl or the different isomers of hexenyl, octenyl, nonenyl, decenyl or dodecenyl.

$C_2$–$C_8$alkenylene e.g. can be vinylene, allylene, methallylene, 1-methyl-2-butenylene, 1,1-dimethyl-3-butenylene, 2-hexenylene, 3-hexenylene or 2-octenylene, $C_2$–$C_5$alkenylene e.g. can be vinylene, allylene, methallylene, 1-methyl-2-butenylene.

$C_1$–$C_{14}$alkylene e.g. can be methylene, 1,2-ethylene, 1,2-propylene, 1,3-propylene, 1,2-butylene, 1,3-butylene, 2,3-butylene, 1,4-butylene or 2-methyl-1,2-propylene, 1,1-dimethyl-methylene, 1,1-dimethyl-1,2-ethylene, 1,1-dimethyl-1,3-propylene, 1,5-pentylene, 3,3-pentylene, 1-ethyl-1-methyl-1,2-ethylen, 1,6-hexylene, 1,1-dimethyl-1,4-butylene, 2,2-dimethyl-1,3-propylene, 1,8-octylene, 1,10-decamethylene, 1,12-dodecylene, 1,1-dimethyl-decamethylene, 1,1-diethyl-decamethylene, 1,1 4-tetradecamethylene, preferably $C_1$–$C_5$alkylen like methylene, 1,2-ethylene, 1,2-propylene, 1,3-propylene, 1,2-butylene, 1,3-butylene, 2,3-butylene, 1,4-butylene or 2-methyl-1,2-propylene, 1,1-dimethyl-methylene, 1,1-dimethyl-1,2-ethylene, 1,1-dimethyl-1,3-propylene, 3,3-pentylene, 1-ethyl-1-methyl-1,2-ethylen, and 2,2-dimethyl-1,3-propylene, $C_2$–$C_{12}$alkylene e.g. stands for 1,2-ethylene, 1,2-propylene, 1,3-propylene, 1,2-butylene, 1,3-butylene, 2,3-butylene, 1,4-butylene or 2-methyl-1,2-propylene, 1,1-dimethyl-methylene, 1,1-dimethyl-1,2-ethylene, 1,1-dimethyl-1,3-propylene, 1,5-pentylene, 3,3-pentylene, 1-ethyl- 1-methyl-1,2-ethylen, 1,6-hexylene, 1,1-dimethyl-1,4-butylene, 2,2-dimethyl-1,3-propylene, 1,8-octylene, 1,10-decamethylene, 1,12-dodecylene, 1,1-dimethyl-decamethylene.

$C_1$–$C_4$alkylene e.g. can be methylene, 1,2-ethylene, 1,2-propylene, 1,3-propylene, 1,2-butylene, 1,3-butylene, 2,3-butylene, 1,4-butylene or 2-methyl-1,2-propylene, 1,1-dimethyl-methylene, 1,1-dimethyl-1,2-ethylene.

$C_3$–$C_8$cycloalkylen can be e.g. cyclopropylene, cyclopentylene and cyclohexylene, preferably cyclohexylene.

$C_1$–$C_{12}$alkoxy can be —O—$C_1$–$C_{12}$alkyl with $C_1$–$C_{12}$alkyl standing for e.g. methyl, ethyl, n-propyl, isopropyl, n-butyl, sec.-butyl, isobutyl, tert.-butyl, n-pentyl, 2-pentyl, 3-pentyl, 2,2-dimethylpropyl, n-hexyl, n-octyl, 1,1,3,3-tetramethylbutyl, 2-ethylhexyl, nonyl, decyl, dodecyl, preferably $C_1$–$C_6$alkyl such as methyl, ethyl, n-propyl, isopropyl, n-butyl, sec.-butyl, isobutyl, tert.-butyl, n-pentyl, 2-pentyl, 3-pentyl, 2,2-dimethylpropyl, n-hexyl, more preferred —O—$C_1$–$C_4$alkyl such as methoxy, ethoxy, n-, i-propoxy, n-, i-, sek.-, tert.-butoxy.

$C_6$–$C_{12}$aryloxy means —O—$C_6$–$C_{12}$aryl, e.g. phenoxy or naphthoxy, preferably phenoxy.

$C_1$–$C_{12}$alkylmercapto is —S—$C_1$–$C_{12}$alkyl, preferably —S—$C_1$–$C_4$alkyl.

$C_6$–$C_{12}$arylmercapro is —S—$C_6$–$C_{12}$aryl, e.g. phenylmercapto or naphthylmercapto, preferred phenylmercapto.

$C_2$–$C_{24}$dialkylamino is —N(alkyl$_1$)(alkyl$_2$), wherein the sum of the carbon atoms in both groups alkyl$_1$ and alkyl$_2$ is an integer from 2 to 24, preferably N($C_1$–$C_4$alkyl)—$C_1C_4$alkyl like dimethylamino.

$C_7$–$C_{24}$alkylarylamino is —N(alkyl$_1$)(aryl$_2$), wherein the sum of the carbon atoms in both groups alkyl$_1$ and aryl$_2$ is an integer from 7 to 24, e.g. methylphenylamino, ethylphenylamino, ethylnaphthylamino or butylphenanthrylamino, preferably methylphenylamino or ethylphenylamino.

$C_{12}$–$C_{24}$diarylamino is —N(aryl$_1$)(aryl$_2$), wherin the sum of the carbon atoms in both groups aryl$_1$ and aryl$_2$ is an integer from 12 to 24, e.g. diphenylamino or phenylnaphthylamino, preferably diphenylamino.

Halogen stands for chlorine, bromine, fluorine or iodine, preferably fluorine or chlorine, particularly preferred chlorine.

n preferably is an integer from 1 to 100, particularly preferred from 2 to 12, such as 2, 3, 4, 5, 6, 7, 8, 9, 10, 11, and 12.

Of particular interest are compounds of formula (II), wherein Q is $C_2$–$C_4$ alkylene such as 1,2-ethylene, 1,2-propylene, 1,3-propylene, 1,2-butylene, 1,3-butylene, 2,3-butylene, 1,4-butylene or 2-methyl-1,2-propylene, 1,1-dimethyl-methylene, 1,1-dimethyl-1,2-ethylene, X is O, and $L_2$ is [—$C_2$–$C_{12}$alkylene—O—]$_n$—$C_1$–$C_{12}$alkyl or $C_1$–$C_{12}$alkyl substituted by $C_1$–$C_{12}$alkoxy in particular those, wherein —Q—X— is a group of the formula —C(CH$_3$)$_2$—CH$_2$—O—.

Further of particular interest are compounds of formula (I), wherein x is 1 or 2 and B is a group of formula

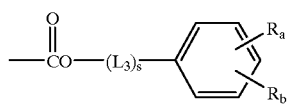
(IIIa)

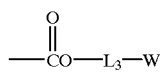
(IVa)

and, if x is 2, one of the B residues may also be hydrogen,
wherein in formulae IIIa and IVa
m is 0 or 1,
$L_3$ is $C_1$–$C_4$-alkylene or $C_2$–$C_5$-alkenylene,
$R_a$ and $R_b$ are each independently of the other hydrogen, $C_1$–$C_4$-alkyl, methoxy, chloro or NO$_2$, and W is hydrogen, CN, CCl₃, a group

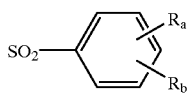

—SO₂CH₃ or —SCH₃, and $R_c$ and $R_d$ in formula IVa are each independently of the other hydrogen, C₁–C₄-alkyl or a group

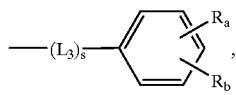

or $R_c$ and $R_d$ form a piperidine residue together with the nitrogen atom they are attached to, and, in particular, those wherein x is 2 and B is a group of formula —C(O)O—CH₂—Ph, —C(O)O-tert.-Bu, —C(O)O-tert.-Amyl, —C(O)O—CH₂-p-pyridyl, —C(O)O-1-pipridinyl and —C(O)O—CH₂—SO₂-p-tolyl.

Preferred compounds of formula I are:

a) perylenecarboxylic acid imides of formula (VIa)

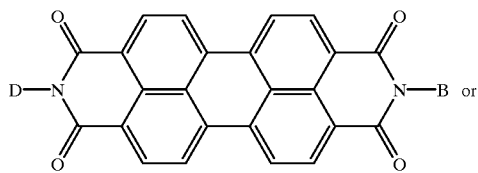

or (VIb)

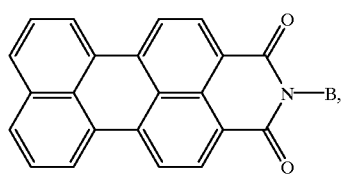

wherein D is hydrogen, C₁–C₆alkyl, phenyl, benzyl or phenetyl which are unsubstituted or substituted by halogen or C₁–C₆alkyl or is the same as B, b) quinacridones of formula (VII)

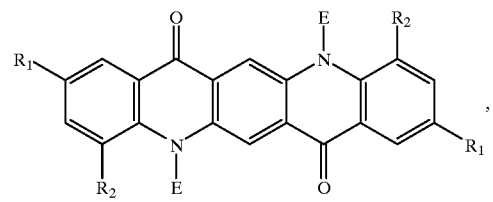

wherein $R_1$ and $R_2$ are each independently of the other hydrogen, halogen, C₁–C₂₄alkyl, C₁–C₄alkoxy or phenyl, c) dioxazines of formula (VIII)

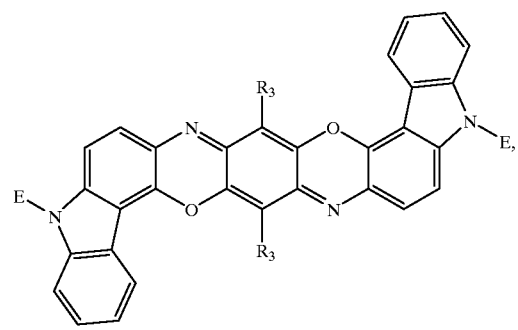

wherein $R_3$ is hydrogen, halogen or C₁–C₂₄alkyl, or of formula (VIIIa)

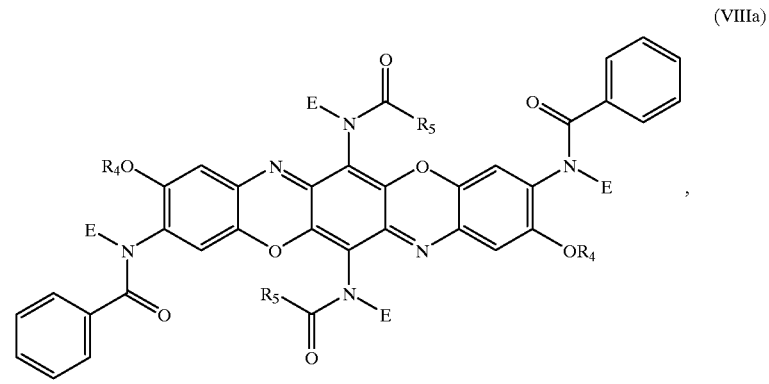

wherein $R_4$ and $R_5$ are each independently $C_1$–$C_4$alkyl, d) isoindolines of formula

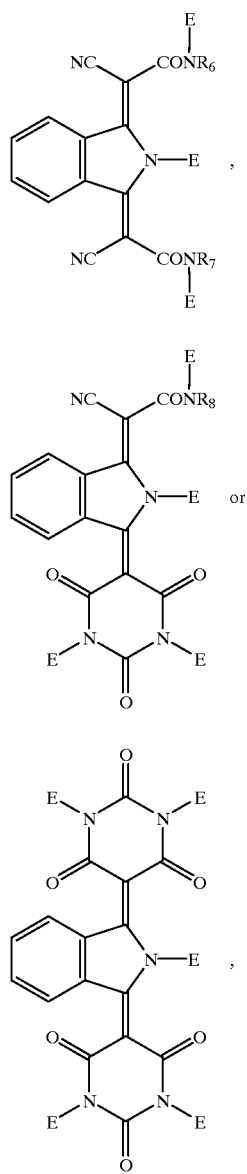

wherein $R_6$ is a group

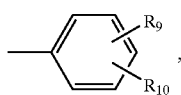

$R_7$ is hydrogen, $C_1$–$C_{24}$alkyl, benzyl or a group

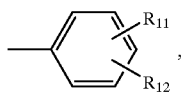

$R_8$ is hydrogen, E or $R_6$, $R_9$, $R_{10}$, and $R_{12}$ are each independently hydrogen, $C_1$–$C_{24}$alkyl, $C_1$–$C_6$alkoxy, halogen or trifluoromethyl, e) indigo derivatives of formula

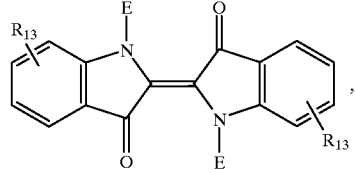

wherein $R_{13}$ is hydrogen, CN, $C_1$–$C_6$alkyl, $C_1$–$C_6$alkoxy or halogen, f) isoindolinones of formula

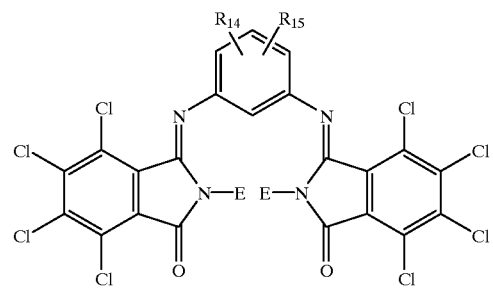

or

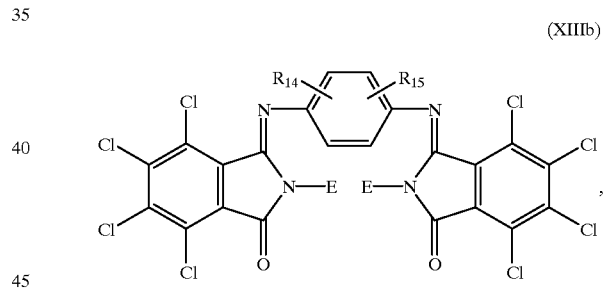

wherein $R_{14}$ and $R_{15}$ are each independently hydrogen, halogen or $C_1$–$C_4$alkyl, g) anthraquinoide compounds of formula

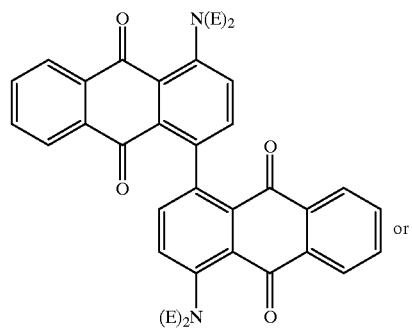

or

-continued

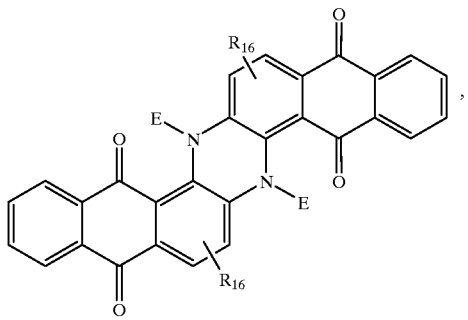
(XIV)

wherein $R_{16}$ is hydrogen or Halogen, h) phthalocyanine compounds of formula

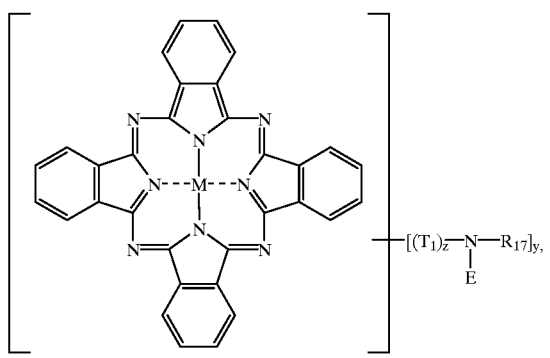
(XV)

wherein

M is $H_2$, a divalent metal selected from the group consisting of Cu(II), Zn(II), Fe(II), Ni(II), Ru(II), Rh(II), Pd(II), Pt(II), Mn(II), Mg(II), Be(II), Ca(II), Ba(II), Cd(II), Hg(II), Sn(II), Co(II) or Pb(II), preferably Cu(II), Zn(II), Fe(II) Ni(II) or Pd(II), or a divalent oxometal selected from the group consisting of V(O), Mn(O) or TiO, $T_1$ is —$CHR_{18}$—, —CO— or —$SO_2$—, $R_{17}$ is hydrogen, $C_1$–$C_6$alkyl, —N(E)$R_{,18}$, N(E)$_2$, —NHCOR$_{19}$. —COR$_{19}$ or

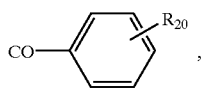

$R_{18}$ is hydrogen or $C_1$–$C_6$alkyl, $R_{19}$ is $C_1$–$C_6$alkyl and $R_{20}$ is hydrogen, halogen, $C_1$–$C_6$alkyl or $C_1$–$C_6$alkoxy, z stands for zero or 1, and y is an integer of 1 to 8, i) pyrrolo[3,4-c]pyrroles of formula

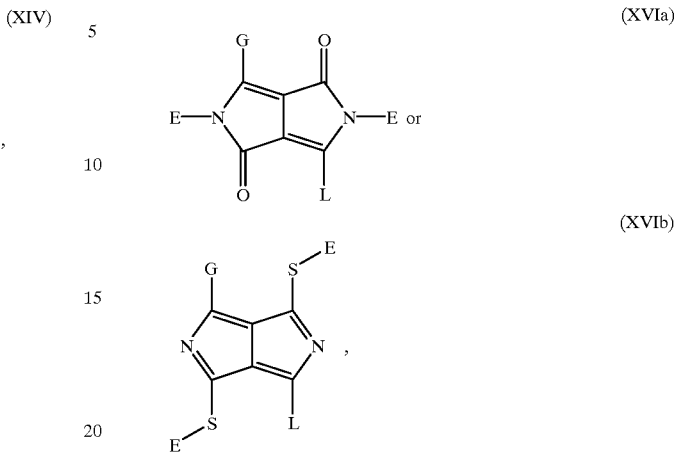
(XVIa)

(XVIb)

wherein G and L are each independently a group of formula

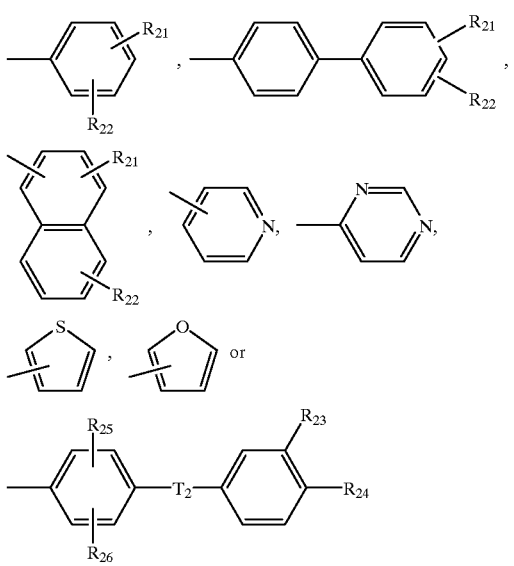

wherein $R_{21}$, and $R_{22}$ are each indepenedently hydrogen, halogen, $C_1$–$C_{24}$alkyl, $C_1$–$C_6$alkoxy, $C_1$–$C_{18}$alkylmercapto, $C_1$–$C_{18}$alkylamino, —CN, —$NO_2$, -phenyl, trifluoromethyl, $C_5$–$C_6$cycloalkyl, —C=N—($C_1$–$C_{24}$alkyl),

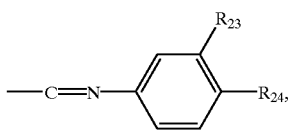

imidazolyl, pyrazolyl, triazolyl, piperazinyl, pyrrolyl, oxazolyl, benzoxazolyl, benzthiazolyl, benzimidazolyl, morpholinyl, piperidinyl or pyrrolidinyl, $T_2$ is $CH_2—$, $—CH(CH_3)—$, $—C(CH_3)_2—$, $—CH=N—$, $—N=N—$, $—O—$, $—S—$, $—SO—$, $—SO_2—$ or $—NR_{27}—$, $R_{23}$ and $R_{24}$ are each independently hydrogen, halogen, $C_1-C_6$alkyl, $C_1-C_6$alkoxy or $—CN$, $R_{25}$ and $R_{26}$ are each independently hydrogen, halogen or $C_1-C_6$akyl and $R_{27}$ is hydrogen or $C_1-C_6$alkyl, j) chinophthalones of formula

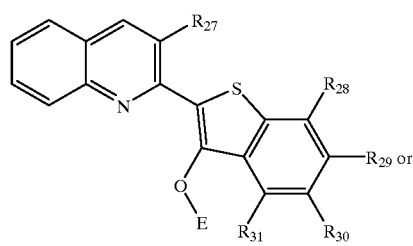

(XVIIa)

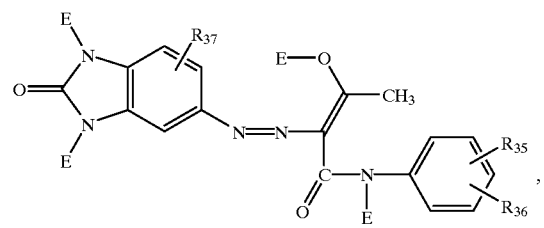

(XVIIb)

wherein $R_{27}$ is H or O—E, $R_{28}$ to $R_{31}$ are each independently hydrogen, halogen, $—COO—C_1-C_6$alkyl or $—CONH—C_1-C_6$alkyl, k) azo compounds of formula

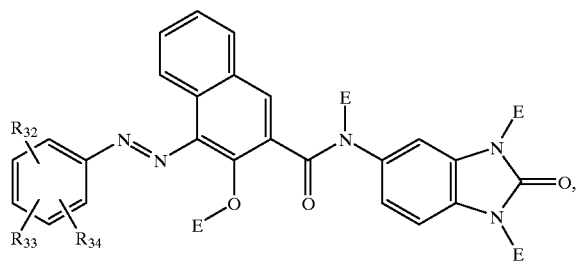

(XVIIIa)

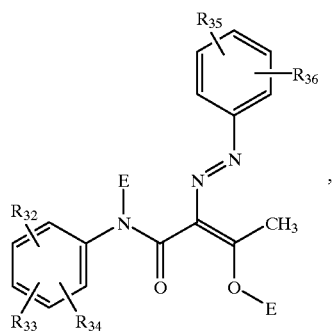

(XVIIIb)

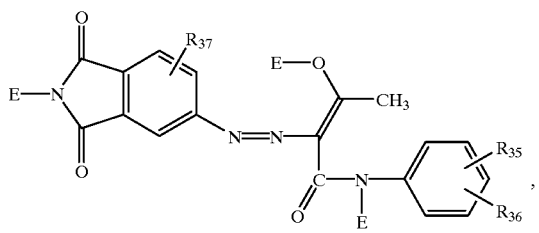

(XVIIIc)

(XVIIId)

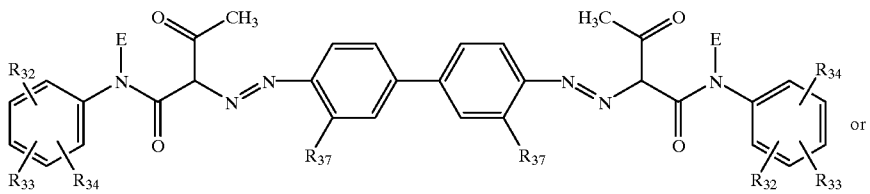
(XVIIIe)

or

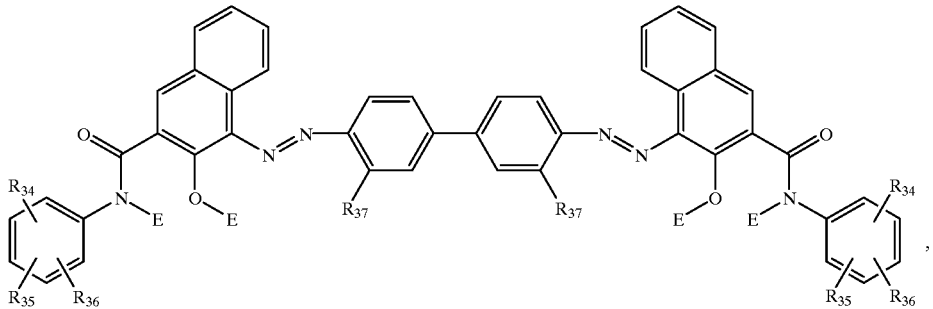
(XVIIIf)

, wherein $R_{32}$ to $R_{36}$ are each independently hydrogen, halogen, $C_1-C_6$alkyl, $C_1-C_6$alkoxy, nitro, acetyl or $SO_2NHC_1-C_6$alkyl, and $R_{37}$ is hydrogen, halogen, $C_1-C_6$alkyl or $C_1-C_6$alkoxy, and l) anthraquinones of formula

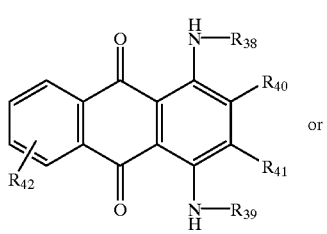
(XIXa)

or

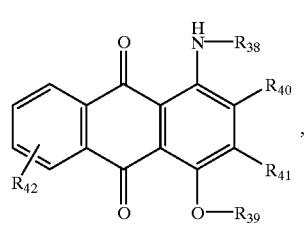
(XIXb)

, wherein $R_{38}$ and $R_{39}$ are each independently hydrogen, $C_1-C_{12}$alkyl or $C_6-C_{12}$aryl which is unsubstituted or substituted by halogen, $C_1-C_6$alkyl, $C_1-C_6$alkoxy, nitro, acetyl, $-SO_2NHC_1-C_6$alkyl or $-SO_2NH_2$, $R_{40}$ and $R_{41}$ are each independently hydrogen, $C_1-C_6$alkyl, $C_1-C_6$alkoxy, nitro, cyano, $CONH_2$, $-SO_2NHC_1-C_6$alkyl, $-SO_2NH_2$, $-SO_3H$, $-SO_3Na$ or $C_6-C_{12}$aryl which is unsubstituted or substituted by halogen, $C_1-C_6$alkyl, $C_1-C_6$alkoxy, nitro, acetyl, $-SO_2NHC_1-C_6$alkyl or $-SO_2NH_2$, and $R_{42}$ is hydrogen, halogen, nitro, cyano, hydroxy or $C_1-C_6$alkoxy, whereby E in the above formulae stands for hydrogen or B, with the proviso that at least one E stands for B, and B has the above given meaning which is also valid for the above mentioned preferred compounds.

Preferred quinacridones are those, wherein in formula VII $R_1$ and $R_2$ are each independently hydrogen, chlorine or methyl.

For the production of N-substituted pyrrolopyrroles, it is mentioned, for example, in U.S. Pat. No. 4,585,878 that they can be obtained by reacting N-unsubstituted pyrrolo-[3,4-c] pyrrole with a compound containing the corresponding N-substituent as releasing groups in an organic solvent. In only one example which describes a compound containing an N-carbonyl group (example 9: N-benzoyl), 1,4-diketo-3, 6-diphenyl-pyrrolo[3,4-c]pyrrole is reacted with benzoyl chloride. In experiments to produce desired carbamates in analogous way by reacting with a corresponding acid chloride derivative, for example, a chlorocarbonic acid ester, it was found that the carbamates could be obtained only at very low yield. However, the desired carbamate can be obtained in good yield by using the corresponding trihaloacetic esters or especially the corresponding dicarbonates. An improved yield is also obtained if the reaction with an aliphatic acid chloride derivative, for example, chloromaleinic acid-butyl ester, is carried out in the presence of a base as a catalyst.

According to EP-A 654 711 a suitable process for the production of compounds of formula III to V is characterized in that a compound of formula $A(H)_x$, wherein A and x have the hereinbefore given meaning and H is attached to N, is reacted at a desired molar ratio with a dicarbonate of formula B—O—B, or with a trihaloacetic acid ester of formula $(R_j)_3C$—B, or with an azide of formula $BN_3$, or with a carbonate of formula B—$OR_k$ or with an alkylidene-iminooxy formic acid ester of formula B—O—C(O)O—N=$CR_lR_m$, wherein B has the hereinbefore given meaning, $R_j$ is chloro, fluoro or bromo, $R_k$ is $C_1-C_4$-alkyl or phenyl unsubstituted or substituted by halogen, $C_1-C_4$-alkyl, $C_1-C_4$-alkoxy or —CN, $R_l$ is —CN or —$COOR_k$, and $R_m$ is phenyl unsubstituted or substituted by halogen, $C_1-C_4$-alkyl, $C_1-C_4$-alkoxy or —CN, in an aprotic organic solvent in the presence of a base catalyst at a temperature between 0 and 400° C., especially between 20 and 200° C., preferably between 10° and 100° C., most preferably between 14 and 40° C., under atmospheric pressure, for 2 to 80 hours.

Preferably, the compound of formula $A(H)_x$, particularly preferred for the preparation of the compound of formula (II), but, too, for the preparation of the compounds represented by formulae III to V, is reacted with a dicarbonate of formula B-O-B in an aprotic organic solvent in the presence of a base catalyst, usually at a temperature in the range of between 0 and 120, particularly between 10 and 100° C., for 2 to 80 hours. In a preferred embodiment the reaction with a dicarbonate of formula B—O—B is carried out at a temperature in the range of from 18 to 40° C., i.e. at ambient temperature, and at a pressure in the range of e.g. 85 kPa to 120 kPa, particularly at atmospheric pressure.

The compounds of formula $A(H)_x$, dicarbonates of formula B—O—B, trihaloacetic acid esters of formula $(R_j)_3C$—B, azides of formula $BN_3$, carbonates of formula B—$OR_k$ and alkylideneiminooxy formic acid esters of formula B—O—C(O)O—N=$CR_lR_m$ are known compounds. As far as some of them would be new, they can be produced in analogy with generally known methods.

The respective molar ratio of the above compounds A and reactive derivatives of B depends on the number of groups B to be introduced. A 2- to 10-fold excess of reactive derivatives of B is generally suitable.

As suitable solvents, there are exemplified, for example, ethers, such as tetrahydrofuran or dioxane, or glycolethers, such as ethyleneglycol-methylether, ethyleneglycol-ethylether, diethyleneglycol-monomethylether or diethyleneglycol-monoethylether, further dipolar-aprotic solvents, such as acetonitrile, benzonitrile, N,N-dimethylformamide, N,N-dimethylacetoamide, nitrobenzene, N-methylpyrrolidon, halogenated aliphatic or aromatic hydrocarbons, such as trichloroethane, benzene or benzene sunstituted by alkyl, alkoxy or halogen, e.g., toluene, xylene, anisole or chlorobenzene, or aromatic N-heterocycles, such as pyridine, picoline or quinoline. Preferred solvents are, for example, tetrahydrofuran, N,N-dimethylformamide and N-methylpyrrolidone. The above solvents can be used also as mixtures. 5–20 parts by weight of solvents are suitably used to 1 part by weight of the reactants.

The bases appropriate as catalysts are, for example, the alkali metals themselves, such as lithium, sodium or potassium, as well as their hydroxides and carbonates, or alkaliamides, such as lithium-, sodium- or potassiumamide or alkalihydrides, such as lithium-, sodium- or potassiumhydride, or alkali earth- or alkalialcoholates, which are derived especially from primary, secondary or tertiary aliphatic alcohols with 1 to 10 C-atoms, e.g., lithium-, sodium- or potassiummethylate, -ethylate, -n-propylate, -isopropylate, -n-butylate, -sec.-butylate, -tert.-butylate, -2-methyl-2-butylate, -2-methyl-2-pentylate, -3-methyl-3-pentylate, -3-ethyl-3-pentylate, and further organic aliphatic, aromatic or heterocyclic N-bases, especially, for example, diazabicyclooctene, diazabicycloundecene and 4-dimethylaminopyridine and trialkylamines, such as trimethyl- or triethylamine. The above bases can be used also as mixtures.

The organic N-bases, such as diazabicyclooctene, diazabicycloundecene and especially 4-dimethylaminopyrridine, are preferred.

As polymerizable substance usually the known monomers or prepolymers, preferably monomers, for carrying out an addition polymerization, for example acrylates, methacrylates, styrene and its polymerizable derivatives, a condensation polymerization, for example monomers with hydroxyl and acid chloride groups, or a polyaddition, such as monomers containing hydroxyl and isocyanate groups can be used.

As corresponding polymers the following are mentioned as an example: polyacrylates, polymethacrylates, polyamides, such as polycaprolactam or polyamide-6,6, or -6,10, polyesters, polycarbonates, polyurethanes, polyether, polyvinylalcohols and corresponding copolymers such as SAN, ASA and ABS, e.g. obtained from monomers like styrene, acrylonitril, methylmethacrylate, butadiene, maleinic acid anhydride, α-methyl styrene and with alkyl and chlorine substituted styrenes, as well as blends of the aforementioned polymers such as polyester/polyamide (as described e.g. in U.S. Pat. No. 4,975,220).

In one preferred embodiment water soluble polymers obtainable from polar vinyl monomers containing e.g. hydroxyl groups, carboxylic acid groups, sulfonic acid groups, tert.-amino groups are preferred. As examples the following monomers are mentioned: polar acrylate esters or methacrylate esters, vinyl acetate and substituted acrylamide containing the abovementioned groups such as hydroxypropyl methacrylate, N-(2,2,2-trichloro-1-hydroxyethyl) acrylamide, tetrahydrofurfuryl methacrylate, hydroxyethyl methacrylate, N,N-(dimethylamino ethyl) acrylamide, methyl acrylamidoglykolate methyl ether, methacrylic acid, acrylic acid, maleic acid, itaconic acid, monomethylmaleate, furanacrylic acid, fumaric acid, and, where possible, the corresponding anhydrides thereof.

In another preferred embodiment acrylate monomers of the formula XX $$CH_2=CR_{43}-COOR_{44} \qquad (XX)$$

wherein $R_{43}$ is hydrogen or methyl, $R_{44}$ is hydrogen, $C_1-C_{12}$ alkyl, —$CH_2$—$CH_2$—$N(R_{45})(R_{46})$, —$CH_2$—CH=$CH_2$, —$CH_2CF_3$, —$CH_2$—$CH_2OR_{45}$, —$CH_2$—CHOH—$R_{45}$, aryl like phenyl or substituted phenyl, or aralkyl like benzyl or phenethyl, $R_{45}$ and $R_{46}$ independently of each other are hydrogen or $C_1-C_4$alkyl, as well as acrylonitril, acrylamide, styrene, vinylacetate, vinyl alcohol or a mixture thereof.

Suitable $C_1-C_{12}$ alkyl groups are methyl, ethyl, n-propyl, isopropyl, n-butyl, i-butyl, sec.-butyl or tert.-butyl, n-pentyl, n-hexyl, n-heptyl, n-octyl, 2-ethyl-hexyl, n-nonyl, n-decyl, n-undecyl, n-dodecyl, preferably $C_1-C_8$ alkyl such as methyl, ethyl, n-propyl, isopropyl, n-butyl, i-butyl, sec.-butyl or tert.-butyl, n-pentyl, n-hexyl, n-heptyl, n-octyl, 2-ethyl-hexyl, particularly preferred are $C_1-C_4$ alkyl groups such as methyl, ethyl, n-propyl, isopropyl, n-butyl, i-butyl, sec.-butyl or tert.-butyl, most preferred is methyl and n-butyl.

Preferred $CH_2-CH_2-N(R_{45})(R_{46})$, —$CH_2$—$CH_2OR_{45}$ and —$CH_2$—CHOH—$R_{45}$ groups are thos which $R_{45}$ and $R_{46}$ are $C_1-C_4$ alkyl groups such as methyl, ethyl, n-propyl, isopropyl, n-butyl, i-butyl, sec.-butyl or tert.-butyl.

If desired, prepolymers obtained from the abovementioned monomers can be used, too.

Preferred acrylate monomers are those of formula XX, wherein $R_{43}$ is hydrogen or methyl and $R_{44}$ is $C_1-C_4$ alkyl, or a mixture thereof.

Especially preferred monomers are methyl acrylate, methyl methacrylate, ethyl acrylate, ethyl methacrylate, n-butyl acrylate, n-butyl methacrylate, and 2-ethyl hexylacrylate.

Particularly preferred are mixtures of methylmethacrylate ("MMA") and butylacrylate ("B"), preferably in a weight ratio of from (MMA:BA)=(40 to 80):(60 to 20).

Most preferred mixtures of methylmethacrylate and n-butylacrylate are in a weight ratio of from (50 to 75):(50 to 25) and especially in a weight ratio of from (65 to 75):(35 to 25).

Further preferred monomers or monomer mixtures are: MMA; MMA/styrene; MMA/BA/styrene/methylacrylate (MA).

Hence, another preferred embodiment of the instant invention relates to pigment compositions, wherein in step (a) as a polymerizable substance methylmethacrylate or a mixture of MMA and BA, or MMA and S, or MMA, BA, S and MA is used.

Polymerization initiators which can be used usually are initiators commonly used for polymerization reactions of especially acrylates, e.g. peroxydes, peresters, hydroperoxydes and azo compounds and also mixtures thereof. Preferred initiators are selected from the group consisting of tert.-butyl peroxyneodecanoate (TBPND), tert.-butylperoxyethylhexylcarbonate (TBPEHC), tert.-amylperoxyneodecanoate (TAPND), tert.-amylperoxypivalate (TAPPI), tert.-butylperoxypivalate (TBPPI), 2,5-dimethyl-2,5-di(2-ethylhexanoylperoxy)hexane (DHPEH), tert.-amylperoxy-2-ethylhexanoate (TAPEH), tert.-butylperoxy-2-ethylhexanoate (TBPEH), tert.-butylperoxy-3,5,5-trimethylhexanoate (TBPIN) and mixtures thereof. Such initiators are known and commercially available.

Particularly preferred are mixtures of tert.-butylperoxyneodecanoate and tert.-butylperoxyethylhexylcarbonate, especially in a weight ratio in the range of from TBPND:TBPEHC=(50 to 90):(50 to 10), preferred from (60 to 80):(40 to 20), most preferred from 70:30. The amount of initiator is preferably 2 to 8%, and more preferably 3 to 5% by weight, based on the total amount of monomer XX (or the corresponding total amount of monomer mixture).

Preferably, the reaction temperature should be sufficiently high to ensure that the polymerization reaction and the reaction from the latent pigment to the pigment take place in a reasonable time. This depends of course from the chosen reactants and can be figured out easily by a person skilled in the art, because the corresponding data are known from the literature. As a rule, the reaction can be carried out at from 70 to 220° C., preferably from 90 to 200° C. Especially, in the case where MMA and BA are to be polymerized and a latent pigment, preferably a diketopyrrolopyrrole, carrying a tert.-butoxycarbonyl or a tert.-amyloxycarbonyl group is used, the reaction can be carried out at a temperature in the range of from 100 to 170° C.

If desired, molecular weight regulators such as primary alkyl mercaptans like sec.-butyl mercaptan, n-dodecyl mercaptan in usual amounts may be added to the reactants.

If desired, the pH can be kept constant in a desired range with known buffers.

If desired, the usual additives and fillers such as crystal growth inhibitors usually in amounts in the range of from 0.01 to 15% by weight, related to the total amount of reactants, rheology improvers usually in amounts in the range of from 0.01 to 15% by weight, related to the total amount of reactants, dispersants usually in amounts in the range of from 0.01 to 30% by weight, related to the total amount of reactants, and stabilizers and antioxidants in effective amounts may be added. In case a latent DPP is used, appropriate crystal growth inhibitors can be chosen from other latent DPP compounds—carrying tert.-butoxy or tert.-amyloxy groups—e.g. as described in U.S. Pat. No. 5,616,725.

In another preferred embodiment of this invention monomer units are chosen for the preparation of pigment preparations for use in water based pigment systems. Corresponding polymer systems are described for example in WO 96/31565. The corresponding polymers are prepared e.g. by the reaction of a mixture of water insoluble vinyl monomers free of polar groups, vinyl nitrile monomers, vinyl surface active monomers, polar vinyl monomers, if desired, and vinyl monomers containing carboxylic acid groups. A preferred polymer is for example described in example 1 of the WO 96/31565.

The ratio of the amounts of monomer XX, monomer mixture resp., and latent pigment varies depending on the desired ratio of polymer:pigment in the pigment preparation. Generally, the weight ratio of latent pigment to the total amount of latent pigment and monomer(s) can be chosen in the range of from 0.1 to 60%, preferred from 1 to 50%, more preferred from 1 to 30%, most preferred from 15 to 35%. Correspondingly, the weight ratio of the amount of monomer XX, resp. monomer mixture, to the total amount of latent pigment and monomer(s) can be chosen in the range of from 40 to 99.9%, preferred from 99 to 50%, more preferred from 99 to 70%, most preferred from 85 to 65%.

Hence, a further aspect of this invention relates to the use of a mixture comprising a latent pigment and a polymerizable substance for the preparation of the inventive pigment composition, preferably comprising nano-sized pigment particles.

Depending on the amounts of latent pigment and monomer XX, resp. monomer mixture, usually the amounts of the pigment and the polymer of the inventive pigment composition vary. In a preferred embodiment of this invention, the pigment composition comprises from 0.01 to 40%, preferably from 25 to 40% by weight of a pigment and from 60 to 99.99%, preferably from 75 to 60% by weight of a polymer.

According to the present invention, the mixture of the latent pigment and the polymerizable substance are treated with heat while mixing the reaction mixture to yield a mixture, preferably a homogeneous mixture of the desired polymer and the desired pigment. Hence, a further embodiment of the present invention relates to a process for the preparation of the inventive pigment composition, preferably comprising nano-sized pigment particles, comprising the following steps:

(a) mixing a latent pigment with a polymerizable substance, (b) treating the mixture of step (a) with heat while mixing the reaction mixture, and (c) cooling the treated reaction mixture to room temperature, and, if desired working up the obtained pigment composition.

The process as a whole can be carried out either batchwise or continuously, preferred continuously. In a particularly preferred embodiment steps (a) and (b) are carried out in an extruder. Depending on the reactants it may be appropriate in some cases to insert a premixing step before step (a) by known methods.

As a rule, the treatment with heat is carried out in a temperature range sufficient to polymerize the monomer units and to react the latent pigments to the corresponding pigments. In a preferred embodiment of the present invention using acrylates as polymerizable substances the temperature is chosen in a range of from 50 to 200° C., preferably from 90 to 200° C., more preferably from 100 to 170° C. Depending on the polymerizable substances and latent pigments the corresponding temperature ranges may be higher or lower.

Generally, the pressure to be applied depends mainly from the chosen temperature, reactants and reaction vessel, e.g. in an extruder usually the pressure is different compared to a reaction vessel used in a batch process. A preferred range in a batch process is e.g. in the range from 0.1 to 10 kPa, preferably from 90 to 900 kPa.

In case the reaction is carried out in an extruder the desired pressure then can be adjusted with corresponding known extruder elements.

Usually, the reaction time depends on the chosen reactants, the desired molecular weight of the polymer to be produced, the chosen reaction temperature, and the reactor (batch process or, preferably, in an extruder). Suitable reaction times can be found easily by a person skilled in the art, if necessary by a few pilot tests. As an example, in case a MMA/BA mixture (7:3) and a diketopyrrolopyrrole with two tert.-butoxycarbonyl or tert.-amyloxycarbonyl groups as latent pigment are the chosen reactants, the reaction time usually is within the range of 0.1 to 2 hours, if the reaction temperature is within the range of from 50 to 150° C.

As mentioned above, a preferred embodiment relates to a process in which the reactants are mixed and treated with heat in an extruder. Usually, any kind of extruder can be used e.g. twin-screw extruders or kneading extruders, but co-rotating twin-screw extruders and especially co-rotating, closely intermeshing extruders are preferred.

The general procedure using an extruder is known, and described e.g. in The Canadian Journal of Chemical Engineering, 71, June 1993 and U.S. Pat. No. 3,637,545.

In a more preferred embodiment a co-rotating twin-screw extruder is used with a L/D (length/diameter) ratio in the range of from 30 to 60, particularly from 40 to 60.

Usually, the throughputs in the extruder depend on the different reactants and, of course, on the size of the extruder. For example, if the throughput for the latent pigment is chosen in the range of from 0.1 to 2.0, preferably from 0.4 to 1.2 kg/h, then, usually, the throughput for the monomer/monomer mixture in general is chosen in the range of from 1 to 5, preferably from 1.0 to 2.5 kg/h, and the throughput for the initiator/initiator mixture in general is chosen in the range of from 0.01 to 1.00, preferably from 0.10 to 0.25 kg/h.

In a preferred embodiment of this invention, a temperature profile is applied to different zones of the used extruder depending on the chosen latent pigment and polymerizable substance. For example, in the first part of the extruder the temperature preferably is chosen not higher than 100 to 150° C. (polymer synthesis), while in the second part of the extruder the temperature preferably is chosen not higher than 120 to 180° C. (to complete decomposition of the latent pigment). Particularly preferred e.g. is a temperature profile in which (a) in approximately within the first quarter of the extruder ($0 \leq x < 0.25L$) the temperature is chosen at about ambient temperature, or not higher than 30° C., (b) in the second quarter of the extruder ($0.25L \leq x < 0.5L$) the temperature is increased to about 70 to 90% of the desired highest temperature, in the third quarter of the extruder ($0.5L \leq x < 0.75L$) the temperature is increased to the desired highest temperature, in the last quarter of the extruder ($0.75L \leq x < L$) at the beginning the temperature preferably is decreased to about 70 to 90% of the desired highest temperature and then increased again to the highest desired temperature. In other preferred embodiments the zone of the extruder with the desired highest temperature can be extended, preferably in combination with the overall length L of the extruder, and, of course, more detailed profiles can be chosen, usually depending on the chosen latent pigments, monomers and initiators.

According to the invention, the reaction mixture which is treated with heat and cooled to room temperature, and, in case a pressure is applied, the pressure is released to ambient pressure by known methods. For example, the reaction mixture of an extruder usually is released into air and/or water at ambient temperature and atmospheric pressure. If desired, further work-up can be carried out such as granulating or pulverizing by known methods to yield granules, powders or pastes, if the powder is mixed with an organic solvent or water.

In another preferred embodiment of the inventive process, the reaction mixture is extruded through a nozzle, preferably to produce fibres, after step (b) and before step (c).

Another embodiment of the instant invention relates to the use of a mixture comprising a latent pigment, preferably a latent diketopyrrolopyrrole as described above, and a polymerizable substance, preferably on the basis of an acrylate or an methacrylate.

Another embodiment of the present invention is related to the use of the inventive pigment composition for the preparation of coloring high molecular weight organic materials, preferably biopolymers, plastic materials, glasses, ceramic products, for formulations in decorative cosmetics, for the preparation of inks, preferably printing inks, gravure inks, offset inks, screen printing inks, security inks, stationary inks, coating inks, jet-inks, inks for stamp pads, inks for impact printing ribbons, inks for packaging printing; paint systems, in particular automotive lacquers, preferably on the base of high solid, waterborne, metallic paints, industrial paints, trade sales paints, coil coating and powder coating; non-impact printing material preferably for thermal wax transfer, ink-jet printing, thermal dye diffusion transfer; colored polymer particles preferably for color toners, particularly preferred for dry copy toners, such as smashed-type dry toners and polymerized-type dry toners, liquid copy toners, electrographic toners, preferably wet toners for electrophotography; color filters, preferably for the preparation of liquid crystal displays and charge combined devices; colored photoresists, photo- and electroconductive polymers, photocell aggregates, dispersion colors, in the biomedical field of application, for solar energy and collecting systems, for coloring porous substrates and photo/repro in general.

In a preferred embodiment of this invention the inventive pigment compositions are used as powder pigments, in the form of pigment preparations, master-batches and dry color. Further, preferred embodiments concern the use for the preparation of inks such as printing inks, gravure inks, offset inks, screen printing inks, flexo, security printing inks, coating inks, or jet-inks;

inks for stationary, inks for stamp pads, inks for impact printing ribbons, and packaging printing;

paints such as automobile paints preferably on the base of high solid, waterborne, metallic paints, industrial paints, trade sales paints, coil coating, powder coating, plastics, especially for laminations, fibres, sheet, and molded articles, non-impact printing material, e.g. for thermal wax transfer, ink-jet printing, thermal dye diffusion transfer, colored polymer particles, especially dry copy toners, liquid copy toners, electrographic toners (i.e. charge generating and transport materials), as well as master batches for plastic coloration, master batches for toner coloration, color toners, color filters, preferably for the preparation of liquid crystal displays (LCD) and charge combined devices (CCD), cosmetics, in the biomedical field, for solar energy and collecting systems, and for coloring porous substrates.

Illustrative examples of suitable organic materials of high molecular weight which can be colored with the pigment compositions of this invention are vinyl polymers, for example polystyrene, poly-α-methylstyrene, poly-p-methylstyrene, poly-p-hydroxystyrene, poly-p-hydroxyphenylstyrene, polymethyl methacrylate and polyacrylamide as well as the corresponding methacrylic compounds, polymethylmaleate, polyacrylonitrile, polymethacrylonitrile, polyvinyl chloride, polyvinyl fluoride, polyvinylidene chloride, polyvinylidene fluoride, polyvinyl acetate, polymethyl vinyl ether and polybutyl vinyl ether; polymers which are derived from maleinimide and/or maleic anhydride, such as copolymers of maleic anhydride with styrene; polyvinyl pyrrolidone; ABS; ASA; polyamides; polyimides; polyamidimides; polysulfones; polyether sulfones; polyphenylene oxides; polyurethanes; polyureas; polycarbonates; polyarylenes; polyarylene sulfides; polyepoxides; polyolefins such as polyethylene and polypropylene; polyalkadienes; biopolymers and the derivatives thereof e.g. cellulose, cellulose ethers and esters such as ethylcellulose, nitrocellulose, cellulose acetate and cellulose butyrate, starch, chitin, chitosan, gelatin, zein; natural resins; synthetic resins such as alkyd resins, acrylic resins, phenolic resins, epoxide resins, aminoformaldehyde resins such as urea/formaldehyde resins and melamine/formaldehyde resin; vulcanized rubber; casein; silicone and silicone resins; rubber, chlorinated rubber; and also polymers which are used, for example, as binders in paint systems, such as novolaks which are derived from $C_1$–$C_6$-aldehydes such as formaldehyde and acetaldehyde and a binuclear or mononuclear, preferably mononuclear, phenol which, if desired, is substituted by one or two $C_1$–$C_9$alkyl groups, one or two halogen atoms or one phenyl ring, such as o-, m- or p-cresol, xylene, p-tert-butylphenol, o-, m- or p-nonylphenol, p-chlorophenol or p-phenylphenol, or a compound having more than one phenolic group such as resorcinol, bis(4-hydroxyphenyl) methane or 2,2-bis(4-hydroxyphenyl)propane; as well as suitable mixtures of said materials.

Particularly preferred high molecular weight organic materials, in particular for the preparation of a paint system, a printing ink or ink, are, for example, cellulose ethers and esters, e.g. ethylcellulose, nitrocellulose, cellulose acetate and cellulose butyrate, natural resins or synthetic resins (polymerization or condensation resins) such as aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyester, ABS, ASA, polyphenylene oxides, vulcanized rubber, casein, silicone and silicone resins as well as their possible mixtures with one another.

It is also possible to use high molecular weight organic materials in dissolved form as film formers, for example boiled linseed oil, nitrocellulose, alkyd resins, phenolic resins, melamine/formaldehyde and urea/formaldehyde resins as well as acrylic resins.

Said high molecular weight organic compounds may be obtained singly or in admixture, for example in the form of granules, plastic materials, melts or in the form of solutions, in particular for the preparation of spinning solutions, paint systems, coating materials, inks or printing inks.

In a particularly preferred embodiment of this invention, the novel pigment compositions are used for the mass coloration of polyvinyl chloride, polyamides and, especially, polyolefins such as polyethylene and polypropylene as well as for the preparation of paint systems, including powder coatings, inks, particularly printing inks, stationary inks, coating inks, jet-inks, color filters, toners, particularly electrophotographic toners, and coating colors.

Illustrative examples of preferred binders for paint systems are alkyd/melamine resin paints, acryl/melamine resin paints, cellulose acetate/cellulose butyrate paints and two-pack system lacquers based on acrylic resins which are crosslinkable with polyisocyanate.

According to observations made to date, the novel pigment compositions can be added in any desired amount to the material to be colored, depending on the end use requirements. In the case of high molecular weight organic materials, for example, the pigments composition according to this invention can be used in an amount in the range from 0.01 to 40, preferably from 0.1 to 20% by weight, based on the total weight of the colored high molecular weight organic material.

Hence, another embodiment of the present invention relates to a composition comprising of (a) 0.01 to 40, preferably 0.1 to 20% by weight, based on the total weight of the colored high molecular organic material, of a pigment composition according to the present invention, and (b) 99.99 to 60, preferably 99.9 to 80% by weight, based on the total weight of the colored high molecular organic material, of a high molecular organic material, and (c) if desired, customary additives such as rheology improvers, dispersants, fillers, paint auxiliaries, siccatives, plasticizers, UV-stabilizers, and/or additional pigments or corresponding precursors in effective amounts, such as e.g. from 0 to 50% b.w., based on the total weight of (a) and (b).

The pigmenting of the high molecular weight organic materials with the novel pigment compositions is usually effected by incorporating said novel pigment compositions, if desired in the form of masterbatches, in the high molecular weight organic materials using customary apparatus suitable to this end, such as extruders, roll mills, mixing or milling apparatus. The material thus treated is then normally brought into the desired final form by methods which are known per se, such as calandering, moulding, extrusion moulding, coating, casting, extruding, by injection moulding.

To produce non-brittle mouldings or to diminish their brittleness, so-called plasticizers can be added to the high molecular weight substances prior to moulding. Plasticizers may be, for example, esters of phosphoric acid, phthalic acid and sebacic acid. Said plasticizers may be added before, during or after pigmenting the high molecular weight substances with the pigment compositions of this invention.

To obtain different shades, the novel pigment compositions may advantageously be used in admixture with fillers, transparent and opaque white, colored and/or black pigments as well as customary luster pigments in the desired amount.

For the preparation of paints systems, coating materials, color filters, toners, preferably electrophotographic toners, inks, particularly stationary inks, coating inks, printing inks, and jet-inks, the corresponding high molecular weight organic substances, such as binders, synthetic resin dispersions etc. and the novel pigment compositions are usually dispersed or dissolved together, if desired together with customary additives such as dispersants, fillers, paint auxiliaries, siccatives, plasticizers and/or additional pigments or pigment precursors, in a common solvent or mixture of solvents. This can be achieved by dispersing or dissolving the individual components by themselves, or also several components together, and only then bringing all components together, or by adding everything together at once. Hence, a further embodiment of the present invention relates to the use of the inventive pigment compositions for the preparation of dispersions and the corresponding dispersions, and paint systems, coating materials, color filters, inks, particularly printing inks such as thermal transfer-type printing inks, stationary inks, coating inks, jet-inks, toners, particularly toners for electrophotography such as smashed-type dry toners, polymerized-type dry toners, wet toners, comprising the inventive pigment compositions.

For application in printing, all customary industrial printing processes can be employed, such as screen printing, rotogravure, bronze printing, flexographic printing and offset printing.

Methods for the preparation of color filters, toners, inks, plastic applications, colored polymer particles and paints are well-known in the art.

E.g. GB-A 2,182,165 describes the preparation of a color filter by sequential application of the red, blue and green pigments to a suitable substrate such as an amorphous silicon thin film transistor. In order to obtain arrays of small dots of the three pigments over the surface of the substrate it is convenient to employ a photolithographic technique whereby each pigment is deposited on a photoetched polymer surface and the pigment and polymer are removed from the un-irradiated areas by washing with a solvent. In general the methods are known as dyeing methods, color resist methods, electron deposition methods and printing methods. E.g. a pigment dispersion can be employed for color resist method, and kneading process using sand-mill or ball-mill can be applied to get the (micronized) pigment dispersion (see for example JP 4-37987 and JP 4-39041). Another source which describes the preparation of color filters is given in U.S. Pat. No. 5,624,467.

An ink-jet printing ink can be prepared by mixing a pigment, a binder, water, an alcohol and additives. As a binder polymers based on acrylate or methacrylate are preferred, particularly preferred are copolymers based on MMA/S, MMA/BA, ethylene-vinyl acetate, ethylene-vinyl acetate (partially hydrolyzed), ethylene-acrylate, ethylene-acrylic acid or combinations thereof. In the instant case, the addition of a base is also preferred to increase the amount of solved polymer if water is used. Any kinds of base can be used and preferably water-soluble amines or sodium and potassium hydroxides are used. Usually the particle size of the pigment in ink-jet printing ink should be small and therefore, it is highly desired to disperse the above mixture by a skandex, a paint-shaker, or any kinds of a dispersing machine (see e.g. U.S. Pat. No. 4,597,794, EP-A 425,439 or U.S. Pat. No. 5,085,698).

Methods for the preparation of inks for thermal ink transfer recording are known e.g. from U.S. Pat. No. 4,510,206 or EP-A 708,710. E.g. a dispersion comprising the inventive pigment composition and a solvent like toluene can used to produce layers or an ink sheet for thermal ink transfer.

For the preparation of a liquid toner the inventive pigment composition usually is dissolved in an organic solvent and is added into an aqueous surfactant solution while stirring. In general, the particle size of the toner is controlled by the stirring rate. After removing the organic solvent, e.g. by heating or evaporation, the solvent is changed from surfactant solution to the desirable solvent yielding the desired liquid toner.

General methods for the preparation of toners are known e.g. U.S. Pat. No. 5,130,220, U.S. Pat. No. 5,354,639 (suspension polymerization), U.S. Pat. No. 4,233,388, U.S. Pat. No. 5,016,823 (by pulverization), EP-A 494,692, Tokkai-Hei-9-324134, U.S. Pat. No. 4,894,308 (electrophotographic toner).

The preparation of colored polymer particles (including toners) can be carried out e.g. according to the methods described in Tokkai-Hei-5-100486 (suspension polymerization) or U.S. Pat. No. 4,077,804 (in situ polymerization) or by interface polymerization. E.g. the inventive pigment compositions can be mixed with a monomer like styrene, yielding a dispersion, then the monomer usually is polymerized yielding the desired particles or toners. Colored polymer particles can be used in the fields of toners (electrophotography), immunological diagnosis, spacer etc.

The inventive pigment compositions can be admixed with various polymers such as flexible polyvinylchloride, polyethylene or polymethylmethacrylate in usual ways such as processing on a 2-roll mill. Tests carried out so far indicate that the inventive pigment compositions show excellent compatibility with the abovementioned polymers.

Hence, further embodiments of the instant invention relate to the use of the inventive pigment composition for the preparation of dispersions, paint systems, coating materials, color filters, inks, preferably printing inks, as well as color toners comprising the inventive pigment compositions.

A further preferred process relates to the preparation of an inventive pigment composition comprising the following steps:

(a) mixing a latent pigment with a polymerizable substance, (b) treating the mixture of step (a) with heat while mixing the reaction mixture, and (c) cooling the treated reaction mixture to room temperature, and, if desired, working up the obtained pigment composition, (d) polymerizing a monomer or a monomer mixture in the presence of the obtained pigment composition of step (c).

The inventive pigment compositions exhibit better dispersibility, transparency and color strength compared to corresponding known compositions. Further, the process to obtain the inventive pigment compositions is an easy, industrial applicable one-step process. In addition, preferably the inventive pigment composition comprises pigment particles with a nano-sized structure. The preparation consists of tailor-made carrier material in order to guarantee compatibility with paint, plastics and printing ink application systems of individual customers, instead of commercially available carrier materials of which wide compatibility is questionable. The pigment in the inventive pigment composition is extremely fine dispersed without the use of dispersing techniques (easy-to-disperse properties). Transparent applications can be obtained by the use of the inventive pigment compositions which show the outstanding fastness of pigments. In addition, no solvents are necessary in the inventive one-step process.

EXAMPLES

Example 1

A loss-in-weight-feeder is filled with 5 kg of the latent pigment with the following formula (obtained analogously to example 2 of U.S. Pat. No. 5,484,943)

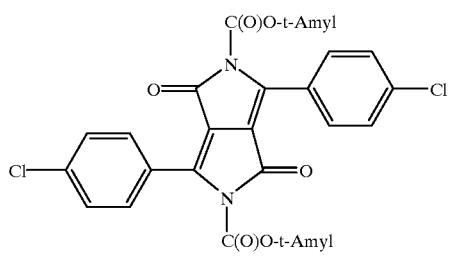

A dosing vessel is flushed with nitrogen and charged with methylmethacrylate monomer (MMA) and butylacrylate monomer (BA) at a ratio of 70:30 (w/w), 10 kg's in total. A second dosing vessel is charged with 3 kg's of a peroxide mixture of TBPND (tert.-butylperoxyneodecanoate) and TBPEHC (tert.-butylperoxyethylhexylcarbonate) in a ratio of 70:30 (w/w). The latent pigment, the monomer mixture and the initiator mixture are metered into a co-rotating twin screw extruder with L/D=52, whereby the throughput of the latent pigment is 0.54 kg/hr, the throughput of the monomer mixture is 2.46 kg/hr, and the throughput of the initiator mixture is 0.15 kg/hr.

The extruder, being divided into 13 zones, all having the same length, and each zone is heated individually. The following temperature profile is applied (1=input zone, 15=screen (200 mesh) changer, 16=die head):

| zone | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| T[° C.] | 30 | 30 | 30 | 60 | 90 | 120 | 120 | 120 | 120 | 120 | 120 | 120 | 120 | 150 | 150 | 160 |

The melt is degassed in zone 12 at a pressure of 5 mbar (absolute), and extruded and filtered in zone 15. The extrudate is collected in a container, broken and ground. The yield of the polymerization reaction is 75%. The concentration of the obtained pigment 1,4-diketo-3,6-di-(4-chlorophenyl)pyrrolo[3,4-c]pyrrol (described in U.S. Pat. No. 4,579,949, ex.6)

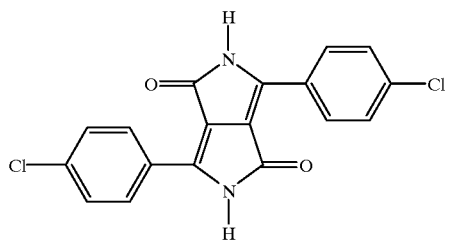

in the preparation is 16% (w/w).

On a two roll mill a foil of polystyrene is made by melting 50 g of polystyrene (N3000 from SHELL; melt flow index MFI 200/5 (DIN 53735): 9 g/10 min) at 170° C. Then 357 mg of the pigment preparation obtained above is added and distributed into the polystyrene-foil within 5 minutes. Thereafter, about half of the foil is put into a mould and pressed at 190° C to form a plate ($100\times150\times2mm^3$). The color strength of this plate is determined spectrophotometrically. The ratio of the color strengths of this plate and a plate having the same pigment and color concentration, but obtained conventionally, is found to be 177%.

Examples 2 to 4

Example 1 is repeated with different throughput rates, and temperature ranges, in example 4 the zones 7–11 are heated to 150° C. instead of 120° C. in ex. 1–3. The reaction parameters and results are given in Table 1 below, whereby the term color strength means the ratio of the color strengths of an inventive example and a plate obtained by a

TABLE 1

| example | throughput rate [kg/h] | reactant | yield of polymer [%] | conc. pigment [%] | color strength [%] |
|---|---|---|---|---|---|
| 2 | 0.91 | latent pigment | 70 | 28 | 172 |
|   | 2.23 | monomer mixt. |    |    |     |
|   | 0.13 | initiator mixt. |   |    |     |
| 3 | 1.15 | latent pigment | 75 | 33 | 165 |
|   | 1.93 | monomer mixt. |    |    |     |
|   | 0.12 | initiator mixt. |   |    |     |
| 4 | 0.41 | latent pigment | 55 | 20 | 175 |
|   | 1.84 | monomer mixt. |    |    |     |
|   | 0.11 | initiator mixt. |   |    |     |

Example 5a 1.9387 kg of a polymethylmethacrylate (Diakon® LG 156 from ICI; Vicat softening point (full) (5 kg load) (DIN 53460 B): 95° C., melt flow index (10 kg) acc. to ASTM D1238-73: 16 g/10 min) is dried at 70° C. for two hours and mixed with 0.0613 kg of the preparation ex. Example 3. The mixture is tumbled for 15 min, processed on a twin screw extruder (L/D=40, throughput: 5 kg/hr) at 200° C., granulated and dried at 70° C. Then the granulated product is injection moulded at 220° C.

Example 5b 1.6933 kg of polymethylmethacrylate (as above in ex. 5a) is dried at 70° C. for two hours and mixed with 0.3067 kg of the preparation ex. Example 3.The mixture is tumbled for 15 min, processed on a twin screw extruder (L/D=40, throughput: 5 kg/hr) at 200° C., granulated and dried at 70° C. The granulated product is injection moulded afterwards at 220° C.

The obtained moulded plates do not show incompatibility effects.

Example 6

50.0 g of polyvinylchloride (SOLVIC®264 GA (Solvay) is processed on a 2 roll mill (20 rpm) for 2 minutes at 170° C. As soon as the melt is homogeneous, 357 mg of preparation ex. Example 1 is added. After 5 minutes processing a transparent foil of about 1 mm thickness is made out of the melt. The foil is tested on migration fastness: after 24 hours under 10 N/150 $cm^2$ (80° C.) no discoloration of the white counterfoil is observed. This procedure is repeated with the preparations ex. Examples 2–4. The obtained foils are transparent as well. The migration fastness of the foils made with these preparations also is excellent.

No incompatibility effects between the preparations and the PVC-compound are observed.

Example 7

A loss in weight feeder is filled with 5 kg of the latent pigment used in ex. 1 (obtained analogously to example 2 of U.S. Pat. No. 5,484,943). A dosing vessel is flushed with nitrogen and charged with methylmethacrylate monomer (MMA) 10 kg in total. A second dosing vessel is charged with 3 kg of a peroxide mixture of tert.-butylperoxyneodecanoate (TBPND) and tert.-butylperoxyethylhexylcarbonate (TBPEHC) in a ratio of 80:20 (w/w). The latent pigment, the monomer mixture and the initiator mixture are metered into a corotating twin screw extruder with L/D=52, whereby the throughput of the latent pigment is 0.4 kg/hr, the throughput of the monomer is 0.90 kg/hr and the throughput of the initiator mixture is 0.10 kg/hr. The extruder, being divided in 13 zones, all having the same length and each zone is heated individually. The following temperature profile is applied

| zone        | 1  | 2  | 3  | 4  | 5  | 6   | 7   | 8   | 9   | 10  | 11  | 12  | 13  | 14  | 15  |
|-------------|----|----|----|----|----|-----|-----|-----|-----|-----|-----|-----|-----|-----|-----|
| temp (° C.) | 30 | 30 | 30 | 65 | 90 | 110 | 125 | 130 | 130 | 130 | 130 | 120 | 120 | 130 | 150 |

The melt is degassed in zone 12 at a pressure of about 50 mbar (absolute). The extrudate is collected in a container, broken and ground. The yield of the polymerization reaction is about 40%. The concentration of the obtained pigment 1,4-diketo-3,6-di-(4-chlorophenyl)pyrrolo-[3,4-c]pyrrol (described in U.S. Pat. No. 4,579,949, ex. 6) in the preparation is 21.3%. The molecular weights of the MMA homopolymer formed are $M_n$=18,3 and $M_w$=56,8 kDalton; the polydispersity ($M_w/M_n$) is 3.1. Electron microscope pictures show particle sizes of about 0.3 micron.

Example 8

A loss in weight feeder is filled with 5 kg of the latent pigment already used in Example 7. A dosing vessel is flushed with nitrogen and charged with methylmethacrylate monomer (MMA) and styrene monomer (S) in a ratio of 80:20 (w/w), 10 kg in total. A second dosing vessel is charged with 3 kg of a peroxide mixture of tert.-butylperoxyneodecanoate (TBPND) and tert.-butylperoxyethylhexylcarbonate (TBPEHC) in a ratio of 80:20 (w/w). The latent pigment, the monomer mixture and the initiator mixture are metered into a corotating twin screw extruder with L/D=52, whereby the throughput of the latent pigment is 0.23 kg/hr, the throughput of the monomer mixture is 0.90 kg/hr and the throughput of the initiator mixture is 0.10 kg/hr. The extruder, being divided in 13 zones, all having the same length and each zone is heated individually. The following temperature profile is applied

| zone        | 1  | 2  | 3  | 4  | 5  | 6   | 7   | 8   | 9   | 10  | 11  | 12  | 13  | 14  | 15  |
|-------------|----|----|----|----|----|-----|-----|-----|-----|-----|-----|-----|-----|-----|-----|
| temp (° C.) | 30 | 30 | 30 | 65 | 90 | 110 | 125 | 130 | 130 | 130 | 130 | 120 | 120 | 130 | 150 |

The melt is degassed in zone 12 at a pressure of about 50 mbar (absolute). The extrudate is collected in a container, broken and ground. The yield of the polymerization reaction is about 50%. The concentration of the obtained pigment 1,4-diketo-3,6-di-(4-chlorophenyl)pyrrolo-[3,4-c]pyrrol in the preparation is 17.8%. The molecular weights of the MMA:S copolymer formed are $M_n$=3,5 and $M_w$=24,4 kDalton; the polydispersity ($M_w/M_n$) is 7.0.

Example 9

A 30 ml glass bottle is filled with 50 g of Zr beads, 6 g of the product obtained in example 8, and 4 g toluene and dispersed for 30 minutes using a Scandex. A sample of 0.2 g is taken and diluted 50 times with intermediate ultrasonic treatment at regular intervals. The remaining is dispersed for another 150 minutes and diluted in the same way. The particle size distribution of both dilutions is 0.5 μm (determined by Microtrac). The particle size is not increased, meaning 'easy-to-disperse' properties. The dispersion stability is observed visually and appears to be very good.

Example 10

2 g of the pigment composition obtained in ex. 1 is mixed with 0.26 g of a dispersant (Disperbyk®162, BYK-Chemie Japan KK) and 15.8 g of 1-methoxy-2-propyl-acetate (from MERCK). The mixture is stirred for 30 min. at room temperature and then a 11.6% (solid content) of pigment dispersion is obtained. A film is coated on a glass substrate by spin coating and the obtained film is highly transparent.

Example 11

Preparation of an Ink for Ink-Jet Printing

A pigment dispersion comprising

| pigment from ex. 1 a binder         | 20.0% b.w. |
|-------------------------------------|------------|
| styrene-acrylate copolymer (binder) | 3.0% b.w.  |
| 25% ammonia solution                | 3.0% b.w.  |
| amino-methyl-propanol               | 0.5% b.w.  |
| ethyleneglycol                      | 2.0% b.w.  |
| de-ionized water                    | 71.5% b.w. | is treated with glassbeads (1.3–1.5 mm) in a skandex for 3 h. Then large sized pigment is removed by centrifuge from obtained ink. Then aqueous pigment dispersion for ink jet is obtained whose pigment concentration is 18% b.w.

The following components are then mixed:

| pigment dispersion (obtained above) | 27.8% b.w. |
|-------------------------------------|------------|
| diethyleneglycol                    | 5.0% b.w.  |

| | |
|---|---|
| Buraimal ®AC507 | 1.5% b.w. |
| (Emulsion, Nihon-Acryl-Chemical) | |
| Multitol | 7.0% b.w. |
| ethanol | 4.0% b.w. |
| de-ionized water | 54.7% b.w. | and then dispersed by skandex for 1 h. Afterwards a pigment dispersion ink is obtained whose solid content was 5% b.w, which can be used as ink for ink-jet printing.

Comparative Example 1

Example 11 is repeated, except that instead of the pigment composition of ex. 1, a corresponding composition is used which is obtained by a conventional method, i.e. mixing the pigment obtained according to ex. 6 in U.S. Pat. No. 4,579,949 with the corresponding amount of a MMA/BA-copolymer (70/30).

The ink obtained by the inventive process is more transparent, and exhibits a better dispersibility.

Example 12

Example for Liquid Toner 1.0 g of the pigment composition obtained in example 8 is dissolved in 5 g of mixed organic solvent (methylenechloride/1,2-dichroloethane/toluene=5/5/1). By heating it to 70 degree, it is completely dissolved and this solution is then dropped into 12 g of a 1% aqueous sodium dodecylsulfonate solution and stirred vigorously. This solution is heated to 70° C. to remove the organic solvent. Thereafter the solution is cooled to room temperature and diluted by ethanol. Then the precipitate is washed three times with water by decantation and exchanged solvent from water to ethanol, 1-propanol, finally, to Isopar®G (highly insulating liquid (more than $10^{10}$ ohm/cm, dielectric constant more than 3, mainly isoparaffinic; from Exxon company). The liquid toner obtained has a solid content of 10% b.w. Its toner size is in the range of from 0.8 μm to 2.6 μm (using a Microtrac UPA 150 particle size analyzer from Leeds and Northrup company). As a charge controlling agent, zirconium 2-ethylhexanoate is added. The zeta potential (using a PEN KEM 501) of the thus obtained minus charged liquid toner is measured to be -45.7.

Example 13

Example 12 is repeated, except that as a charge controlling agent zirconium naphtylate is added. The zeta potential of the plus charged liquid toner is 10.7.

Example 14

0.1 g of the pigment composition obtained in ex. 1 is dissolved in 7.0 g of a solvent mixture (tetrahydrofurane (THF)/toluene/1-propanol=4.0 g/1.5 g/1.5 g) at 80° C. Then this solution is cooled to room temperature slowly with stirring. After cooling to room temperature, the solvent is removed from the precipitate and exchanged to Isopar®G using a centrifuge. The thus obtained liquid toner has a solid content of 10% b.w. Its toner size is in the range of from 1 μm to 2 μm.

Example 15

Preparation of Colored Particles 1 g of the product obtained in ex. 8 and 2 g of polystyrene (Wako, n=ca.3000) 2 g are dissolved in 15 g of methylene dichloride. The solution is then added with stirring to 200 g of a 1% solution of polyvinyl acetate in water (using a stirrer from Shinto Kagaku HEIDON, Type 1200G, at a speed of 880 rounds per minute (rpm)). Then the mixture is stirred over night allowing the solvent to evaporate. The thus obtained colored polymer particles are then isolated with the help of a centrifuge and washed with water. The resulted amount of red color particles is 1.55 g (yield: 52%).

Example 16

Preparation of Colored Polymer Particles by Suspension Polymerization

A mixture of 3 g of the product obtained in ex. 8, 7 g of butyl acrylate, 0.5 g of benzoyl peroxide is treated for 10 minutes in an ultrasonic bath and deoxygenated by nitrogen replacement. This mixture is then added slowly to 200 g of a deoxygenated (by nitrogen replacement) 1% aqueous solution of polyvinylalcohol (from Aldrich, 87–89% hydrolyzed, $M_w$=124,000–186,000 g/mol) while stirring at a speed of 800 rpm. After one hour, the mixture is heated to 80° C. and kept for four hours. Afterwards, the mixture is cooled to room temperature and centrifuged (3000 rpm) and washed with water yielding 3.8 g (38%) of colored polymer particles.

Example 17

Example 16 is repeated, but a mixture of styrene and butyl acrylate (7:3) is used instead of butyl acrylate above. The resulted amount of colored polymer particles is 3.8 g (38%).

What is claimed is:

1. Pigment composition comprising
    a) a latent pigment and b) a polymerizable substance selected from the group consisting of methyl(meth) acrylate, ethyl(meth)acrylate, butyl(meth)acrylate, styrene and mixtures thereof.

2. Pigment composition according to claim 1, wherein the latent pigment is a latent diketopyrrolopyrrole with two tert.-butoxycarbonyl or tert.-amyloxycarbonyl groups as substituents.

3. Pigment composition obtained by
    (a) mixing a latent pigment with a polymerizable substance,
    (b) treating the mixture of step (a) with heat while mixing the reaction mixture, and
    (c) cooling the treated reaction mixture to room temperature, and, optionally working up the obtained pigment composition, wherein the polymerizable substance is methylmethacrylate, or a mixture of methylmethacrylate and butylacrylate, or methylmethacrylate and styrene, or methylmethacrylate, butylacrylate, styrene and methylacrylate.

4. Pigment composition obtained by
    (a) mixing a latent pigment with a polymerizable substance,
    (b) treating the mixture of step (a) with heat while mixing the reaction mixture, and
    (c) cooling the treated reaction mixture to room temperature, and, optionally working up the obtained pigment composition,
wherein steps (a) and (b) are carried out simultaneously in an extruder, wherein the polymerizable substance is methylmethacrylate, or a mixture of methylmethacrylate and butylacrylate, or methylmethacrylate and styrene, or methylmethacrylate, butylacrylate, styrene and methylacrylate and wherein the latent pigment is a latent diketopyrrolopyrrole with two tert.-butoxycarbonyl or tert.-amyloxycarbonyl groups as substituent.

5. Process for the preparation of a pigment composition according to claim 1 comprising the following steps:
   (a) mixing a latent pigment with a polymerizable substance,
   (b) treating the mixture of step (a) with heat while mixing the reaction mixture, and
   (c) cooling the treated reaction mixture to room temperature, and, optionally working up the obtained pigment composition.

6. Process for the preparation of a pigment composition, said process comprising the steps of:
   (a) mixing a latent pigment with a polymerizable substance,
   (b) treating the mixture of step (a) with heat while mixing the reaction mixture,
   (c) extruding the treated reaction mixture of step (b) through a nozzle and
   (d) cooling the extruded mixture of step (c) to room temperature, and optionally working up the obtained pigment composition.

7. Method of using the pigment composition according to claim 1 for the preparation of coloring high molecular weight organic materials, for formulations in decorative cosmetics, for the preparation of inks, paint systems, coil coating and powder coating, non-impact printing material, colored polymer particles, color filters, colored photoresists, photo- and electroconductive polymers, photocell aggregates, dispersion colors, in the biomedical field of application, for solar energy and collecting systems, for coloring porous substrates and photo/repro in general, comprising adding the pigment composition to the corresponding material in ways known in the art.

8. Composition comprising
   (a) 0.01 to 40% by weight, of a pigment composition according to claim 3, and
   (b) 99.99 to 60% by weight, of a high molecular weight organic material, and
   (c) optionally, customary additives selected from the group consisting of rheology improvers, dispersants, fillers, paint auxiliaries, siccatives, plasticizers, UV-stabilizers, additional pigments and mixtures thereof in effective amounts, whereby the total amount of components (a) and (b) make up 100%.

9. Method of using a pigment composition obtained by:
   (a) mixing a latent pigment with a polymerizable substance,
   (b) treating the mixture of step (a) with heat while mixing the reaction mixture,
   (c) cooling the treated mixture of step (b) to room temperature, and optionally working up the obtained pigment composition,
for the preparation of dispersions, said method comprising dispersing the pigment composition in a solvent comprising a binder.

10. Paint systems comprising a pigment composition obtained by:
    (a) mixing a latent pigment with a polymerizable substance,
    (b) treating the mixture of step (a) with heat while mixing the reaction mixture,
    (c) cooling the treated mixture of step (b) to room temperature, and optionally working up the obtained pigment composition.

11. Coating materials comprising the compositions according to claim 1.

12. Color filters comprising the compositions according to claim 1.

13. Inks comprising a pigment composition obtained by:
    (a) mixing a latent pigment with a polymerizable substance,
    (b) treating the mixture of step (a) with heat while mixing the reaction mixture,
    (c) cooling the treated mixture of step (b) to room temperature, and optionally working up the obtained pigment composition, wherein the polymerizable substance is methylmethacrylate, or a mixture of methylmethacrylate and butylacrylate, or methylmethacrylate and styrene, or methylmethacrylate, butylacrylate, styrene and methylacrylate.

14. Color toners comprising a pigment composition obtained by
    (a) mixing a latent pigment with a polymerizable substance,
    (b) treating the mixture of step (a) with heat while mixing the reaction mixture, and
    (c) cooling the treated reaction mixture to room temperature, and, optionally working up the obtained pigment composition.

15. Process for the preparation of a pigment composition comprising the following steps:
    (a) mixing a latent pigment with a polymerizable substance,
    (b) treating the mixture of step (a) with heat while mixing the reaction mixture, and
    (c) cooling the treated reaction mixture to room temperature, and, optionally, working up the obtained pigment composition,
    (d) polymerizing a monomer or a monomer mixture in the presence of the obtained pigment composition of step (c).

16. Pigment composition obtained by
    (a) mixing a latent pigment with a polymerizable substance,
    (b) treating the mixture of step (a) with heat while mixing the reaction mixture, and
    (c) cooling the treated reaction mixture to room temperature, and, optionally working up the obtained pigment composition,
wherein the polymerizable substance is a monomer of the formula XX $$CH_2=CR_{43}-COOR_{44} \quad (XX)$$

wherein $R_{43}$ is hydrogen or methyl, $R_{44}$ is hydrogen, $C_1$–$C_{12}$ alkyl, —$CH_2$—$CH_2$—$N(R_{45})(R_{46})$, —$CH_2$—$CH$=$CH_2$, —$CH_2CF_3$, —$CH_2$—$CH_2OR_{45}$, —$CH_2$—$CHOH$—$R_{45}$ or an aryl group, an aralkyl group, $R_{45}$ and $R_{46}$ independently of each other are hydrogen or $C_1$–$C_4$alkyl, acrylonitrile, acrylamide, styrene, vinylacetate or mixtures thereof.